United States Patent [19]
Giffard

[11] Patent Number: 6,061,219
[45] Date of Patent: May 9, 2000

[54] DEVICE FOR THE PROTECTION OF AN ELECTRICAL LOAD AND POWER SUPPLY CIRCUIT HAVING SUCH A DEVICE

[75] Inventor: Benoit Giffard, Grenoble, France

[73] Assignee: Commissariat A L'Energie Atomique, Paris, France

[21] Appl. No.: 09/113,463

[22] Filed: Jul. 10, 1998

[30] Foreign Application Priority Data

Aug. 1, 1997 [FR] France .................................. 97 09872

[51] Int. Cl.[7] .................................................. H02H 9/00
[52] U.S. Cl. ...................................................... 361/58
[58] Field of Search ............................... 361/58, 93, 100, 361/101, 18, 93.1, 93.9

[56] References Cited

U.S. PATENT DOCUMENTS

| | | | |
|---|---|---|---|
| 3,603,811 | 9/1971 | Day et al. ................................. | 361/58 |
| 4,300,091 | 11/1981 | Schade, Jr. .............................. | 323/315 |
| 5,010,380 | 4/1991 | Avery ....................................... | 361/100 |

FOREIGN PATENT DOCUMENTS 0 780 952 A1   6/1997   European Pat. Off. .

*Primary Examiner*—Ronald W. Leja
*Attorney, Agent, or Firm*—Pearne, Gordon, McCoy & Granger LLP

[57] ABSTRACT

Device for the protection of an electrical load. A branch (4) connects an input terminal (1) to an output terminal (2). The branch includes in series:

a channel of a first transistor (10) of the "normally on" type and a channel of a second transistor (20) of the "normally on" type of a second conductivity type. A gate (10g) of the first transistor (10) is connected to the output terminal (2) and a gate (20g) of the second transistor (20) is connected to the input terminal (1) by means of a third "normally on" transistor (30) of the first conductivity type. A gate (30g) is connected to a node (6) between the channels of the first and second transistors. The device has application to the protection of electronic components.

11 Claims, 1 Drawing Sheet

DEVICE FOR THE PROTECTION OF AN ELECTRICAL LOAD AND POWER SUPPLY CIRCUIT HAVING SUCH A DEVICE

TECHNICAL FIELD

The present invention relates to a device for the protection of an electrical load and a power supply circuit having such a device.

The device according to the invention can be used for a wide range of electrical loads. However, a preferred field of application is that of the electrical protection of electrical and electronic components and cards.

In particular, the device according to the invention aims at protecting an electrical load against an accidental overcurrent or over-voltage occurring in a power supply circuit of said load.

PRIOR ART

Among the known load protection devices, a distinction is generally made between devices connected in series with the electrical load and devices connected in parallel with the electrical load.

A protection device connected in parallel with an electrical load is generally designed for limiting or cancelling the voltage at its terminals, when said voltage reaches a predetermined value. Examples of such devices are Transil diodes and Trisil thyristors (registered trademarks of SGS THOMSON ELECTRONICS).

A protection device connected in series with the electrical load to be protected is generally designed for limiting or cancelling the current flowing in the circuit, when said current reaches a predetermined value. As an example of such a device, reference can be made to the electromechanical circuit-breakers equipping the electrical switchboards of the public power supply network.

Protection devices to be connected in parallel with the load can be implemented economically and are generally of small size. They are consequently usable in integrated electronic circuits.

However, devices to be connected in series with the load to be protected, such as circuit-breakers, are generally costly, large and poorly adapted to integration.

DESCRIPTION OF THE INVENTION

The present invention proposes a device for the protection of an electrical load, which can be produced in miniaturized form and, optionally, in the form of a circuit integrated in a semiconductor substrate.

Another aim is the provision of such a device having a particularly low production cost.

A further aim of the invention is to provide a device able to withstand high overvoltages compared with a predetermined cutoff voltage.

In order to achieve the above aims, the invention more particularly relates to a device for the protection of an electrical load, comprising a conduction branch connecting an input terminal to an output terminal, said conduction branch having in series:

a channel of a first transistor of the "normally on" type, of a first conductivity type, a channel of a second transistor of a "normally on" type, of a second conductivity type opposite to the first conductivity type, and wherein the gate of said first transistor is connected to the output terminal and the gate of said second transistor is connected to the input terminal via a third transistor of the "normally on" type and of the first conductivity type. The gate of the third transistor is connected to a node located between the channels of the first and second transistors.

The term electrical load is understood to mean one or more electrical or electronic devices, through which an electrical current can flow. The electrical or electronic devices can incorporate both low current consuming means, such as electronic cards, and high consuming means, such as electric motors.

The term "normally on" transistor means a transistor which is in the on or conductive state, when the voltage applied between its gate and its source ($V_{gs}$) is zero and remains on whilst said current remains above the threshold voltage of the transistor (also known as the switching threshold).

The first and third transistors are advantageously high voltage transistors, i.e. able to withstand voltages of e.g. a few hundred volts. According to a particular choice, the first and third transistors can be of the IGBT (Insulated Gate Bipolar Transistor) type and the second transistor can e.g. be of the MOS (Metal-Oxide-Semiconductor) type.

Preferably, the first, second and third transistors can be chosen so as to respectively have first, second and third switching thresholds, such that the third transistor remains in an on mode when a current flows through the first and second transistors.

In this embodiment, the stopping of the current flowing through the device is controlled by the inhibiting of one of the first and second transistors.

The switching threshold of the third transistor is chosen in such a way that it is inhibited when the voltage ($V_{DD}$) applied between the input and output terminals is below a voltage which would damage the gate of the second transistor.

Thus, the gate of the second transistor is not exposed to the voltage between the input and output terminals, when this is excessive for the gate of said second transistor.

As a result of this feature, the gate of the second transistor is protected and the device is able to withstand very high voltages.

According to another aspect of the invention, the device can also incorporate a reverse-biased Zener diode, connecting the gate of the second transistor to the output terminal.

The Zener diode ensures that the gate voltage of the second transistor, which is floating when the third transistor is inhibited, does not assume excessive values. Thus, the Zener diode permits the diversion of any leakage current of the third transistor.

Other features and advantages of the invention can be better gathered from the following description with reference to the attached drawings. This description is given in a purely illustrative and non-limitative manner. In particular, the transistors used in the described embodiment are of the MOS type, but it is obvious that other transistor types can be used, such as e.g. bipolar transistors or MOS-bipolar transistors (e.g. IGBT).

DETAILED DESCRIPTION OF AN EMBODIMENT OF THE INVENTION

Figure 1:
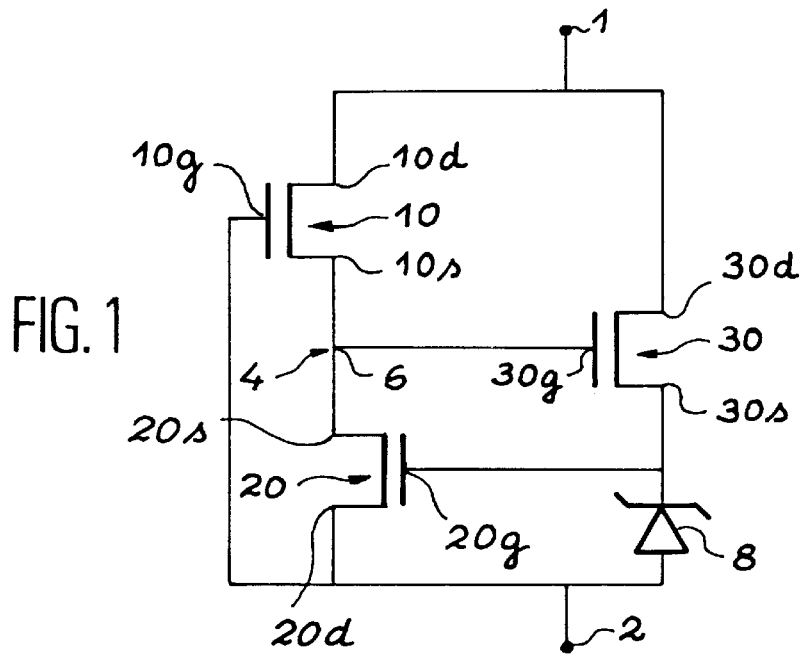
FIG. 1 is an electronic diagram showing an embodiment of the protection device according to the invention.

References 1 and 2 in FIG. 1 respectively designate the input and output terminals of a device according to the invention. In the following description, it is assumed that the input terminal 1 is a positive terminal connected to a positive potential $V_{DD}$ and that the output terminal 2 is an earth or ground terminal connected to an earth or ground potential arbitrarily fixed at 0 volt.

In order starting from the input terminal, a conduction branch 4 has the channel of a first field effect transistor 10 and the channel of a second field effect transistor 20.

The first field effect transistor 10 is a N-channel MOS transistor, or NMOS, and has a negative threshold voltage $V_{T10}$. The second field effect transistor 20 is a P-channel transistor or PMOS and has a positive threshold voltage $V_{T20}$.

It is pointed out that a NMOS transistor is on if the gate voltage thereof $V_{gs}$ exceeds its threshold voltage and a PMOS transistor is on if its gate voltage is below its threshold voltage.

The first and second transistors 10, 20 are "normally on" transistors and are consequently in the on or conductive state, when the voltage measured between their gate and their source is zero.

To facilitate understanding of the drawings, the references 10s, 20s, 10d, 20d and 10g, 20g respectively designate the sources, drains and gates of the first and second transistors.

A third transistor 30, also of the NMOS, normally conductive type, having a negative threshold voltage $V_{T30}$, connects the gate 20g of the second transistor to the input terminal 1. The gate 30g of the third transistor is connected to a node 6 located between the first and second transistors and more specifically between the sources 10s and 20s of the first and second transistors. The sources and drain of the third transistor respectively carry the references 30s and 30d.

A Zener diode 8 also connects the gate 20g of the second transistor 20 to the output terminal 2.

Finally, the gate 10g of the first transistor is directly connected to the output terminal 2.

In the above circuit, the following relations are proved:

$V_{g10}=0$
$V_{g30}=\alpha V_{DD}$
$V_{g20}=V_{DD}$ (if the third transistor is on)
$V_{s10}=\alpha V_{DD}$
$V_{s30}=V_{DD}$ (if the third transistor is on)
$V_{s20}=\alpha V_{DD}$.

In these relations, $V_g$ and $V_s$ respectively indicate the gate and source voltage and the numbers 10, 20 and 30 refer to the first, second and third transistors. The term $\alpha$ is such that $0 \leq \alpha \leq 1$ and represents the state of the potential of the node 6, between the first and second transistors, between 0 volt (terminal 2) and $V_{DD}$ (terminal 1) by design.

When the voltage $V_{DD}$ applied to the input terminal is low, i.e. lower in absolute terms than the threshold voltages $V_{T10}$, $V_{T20}$ and $V_{T30}$, the first, second and third transistors are on. A current then flows between the input and output terminals and consequently across a load optionally connected to the device. The current traverses the channels of the first and second transistors.

If a current call becomes high, the voltage $V_{DD}$ measured between the input 1 and output 2 terminals increases.

When the voltage $V_{DD}$ becomes sufficiently high, in absolute values, one of the first and second transistors, or both, become inhibited. Thus, the thresholds of the first, second and third transistors are preferably chosen in such a way that the third transistor remains on for as long as a current flows in the branch 4 having the first and second transistors.

During the inhibiting of one of the first or second transistors (or both) at least one of the following conditions is proved:

$V_{gs10}=-\alpha \cdot V_{DD}<V_{T10}$ preferably if $\alpha$ is closer to 1,
$V_{gs20}=V_{DD}(1-\alpha)>V_{T20}$ preferably if $\alpha$ is closer to 0.

The inhibiting of at least one of the first and second transistors 10, 20 leads to the stopping of the current flowing in the branch 4, i.e. the current crossing the device.

When no current traverses the device, the voltage $V_{DD}$ can rise to very high values, which are dependent on the design of the device and in particular the choice of components.

The effect of a high voltage applied to the gate of the second transistor would be to damage the gate oxide film separating the gate from the channel of said transistor.

Thus, the choice of the threshold voltage $V_{T30}$ of the third transistor is such that its inhibition occurs for a voltage $V_{DD}$ applied to the device, which is higher than the inhibiting voltage of the first and second transistors, but lower than a voltage $V_{DD}$ which would damage the gate of the second transistor. Thus, when the third transistor is inhibited, the voltage $V_{DD}$ applied to the device is transferred to its terminals and the gate of the second transistor, which has become floating, is protected. It is therefore possible to withstand a higher voltage at the terminals of the device.

The Zener diode 8 is provided so as to ensure that the floating voltage of the gate of the second transistor does not assume excessive values, by diverting to the output terminal (earth) a possible leakage current of the third transistor 30.

The calculation of the term $\alpha$ when the voltage $V_{DD}$ reaches a predetermined limit value $V_{DDlim}$ is explained hereinafter.

$\alpha$ is calculated for $V_{DD}=V_{T20}-V_{T10}=V_{DDlim}$. If the first transistor 10 is just inhibited or off, with $V_{gs10}=V_{T10}$, then $V_{gs10}=V_{gs10}-V_{s10}=0-\alpha V_{DD}=-\alpha[V_{T20}-V_{T10}]=V_{T10}$ $$\text{i.e. } \alpha = \frac{V_{T10}}{V_{T10} - V_{T20}}$$

$$\text{and } (1-\alpha) = \frac{-V_{T20}}{V_{T10} - V_{T20}}$$

We then have for the second transistor 20:
$V_{gs20}=V_{g20}-V_{s20}=V_{DDlim}(1-\alpha)$ $$V_{gs20} = V_{g20} - V_{s20} = V_{DDlim}(1-\alpha)$$
$$= (V_{T20} - V_{T10})\left(\frac{-V_{T20}}{V_{T10} - V_{T20}}\right)$$
$$= V_{T20}$$

(which corresponds to the inhibiting of the second transistor 20).

Thus, both the first and second transistors are inhibited under the following conditions:

$$\alpha = \frac{V_{T10}}{V_{T10} - V_{T20}}$$

and $V_{DD}=V_{DDlim}=V_{T20}-V_{T10}$.

It is pointed out that the thus established value of $\alpha$ is stable. Thus, if $\alpha$ increases slightly, the first transistor 10 remains off, whilst the second transistor 20 becomes conductive, which has the effect of reducing α. Conversely, if α decreases slightly, the second transistor 20 remains off, whilst the first transistor becomes conductive, which has the effect of increasing α.

Finally, when $V_{DD}$ reaches the value $V_{DDlim}$, α assumes the aforementioned, stable value.

In a particular application, the threshold voltages of the first and second transistors are chosen equal in absolute value, and lower in absolute value than the threshold voltage of the third transistor.

For example, we choose:

$V_{T10}$=−2.0 V, $V_{T20}$=+2.0 V, $V_{T30}$=2.0 V.

Thus, the values of $V_{DDlim}$ and α are respectively $V_{DDlim}$=+4.0 V, and α=0.5 for $V_{DD}$=$V_{DDlim}$.

For this operating point, the following relation is proved:

$V_{gs30}$=α$V_{DDlim}$−$V_{DDlim}$=−2.0 V.

Thus, the voltage $V_{gs30}$ measured between the gate and source of the third transistor is not lower than its threshold voltage.

The third transistor, which is of the NMOS type in the example described, remains on for as long as a current flows through the first and second transistors.

The voltage for rendering conductive the Zener diode is higher in absolute terms than $V_{DDlim}$, i.e. e.g. 5 V.

Figure 2:
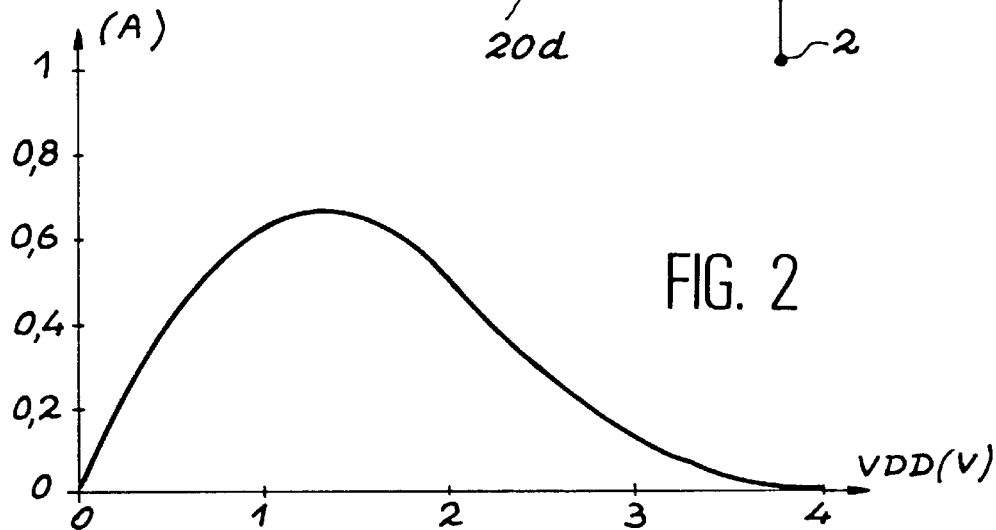
FIG. 2 is a current-voltage characteristic of the device of FIG. 1.

FIG. 2 represents a current-voltage characteristic of the device implemented in accordance with the numerical example given herein-before.

The current, on the ordinate, is given in amperes, whilst the voltage, on the abscissa, is given in volts.

It is pointed out that the device is on for low $V_{DD}$ values. The current flowing through the device passes through a maximum and is then inhibited as from the value $V_{DD}$=$V_{DDlim}$=$V_{T20}$=$V_{T10}$.

Figure 3:
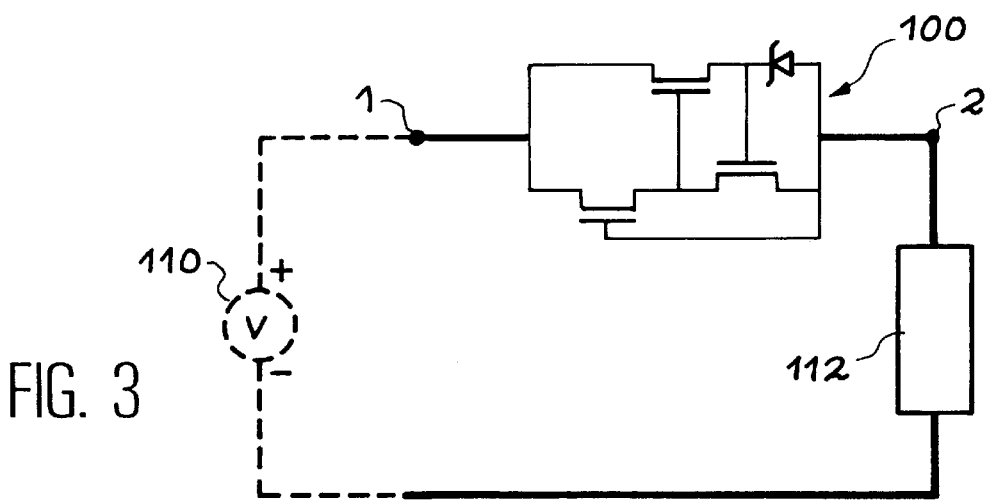
FIG. 3 is a power supply circuit diagram of a load using the protection device of FIG. 1.

FIG. 3 shows a power supply circuit of an electrical load incorporating a protection device of the type described hereinbefore.

The protection circuit is designated overall by the reference 100. The references 110 and 112 respectively designate an electric power supply source and a load to be protected.

The input terminal 1 of the protection device 100 is connected to a positive terminal of the power supply 110. The output terminal 2 is connected to the electrical load 112.

Thus, in the circuit, the protection device 100 and load 112 are connected in series between the terminals of the power supply.

The device according to the invention can be implemented with a reduced number of discreet components. However, it is also possible to implement it in an integrated form in a substrate, such as e.g. a silicon substrate.

Advantageously, the protection device can be integrated into the same substrate as an electronic circuit constituting the load to be protected.

What is claimed is:

1. Device for the protection of an electrical load, comprising a conduction branch (4) connecting an input terminal (1) to an output terminal (2), the conduction branch having in series:

a channel of a first transistor (10) of the "normally on" type polarized to be switched between conductive and inhibited states, of a first conductivity type, and a channel of a second transistor (20) of the "normally on" type polarized to be switched between conductive and inhibited states of a second conductivity type, opposite to the first conductivity type, and wherein a gate (10g) of said first transistor (10) is connected to the output terminal (2), and a gate (20g) of the second transistor (20) is connected to the input terminal (1) by means of a third transistor (30) of the "normally on" type and of the first conductivity type, the third transistor having a gate (30g) connected to a node (6) located between the channels of the first and second transistors.

2. Device according to claim 1, also having a reverse-biased Zener diode (8) connecting the gate of the second transistor (26) to the output terminal (2).

3. Device according to claim 1, wherein the first, second and third transistors respectively have first, second and third threshold voltages ($V_{T10}$, $V_{T20}$, $V_{T30}$), chosen in such a way that the third transistor (30) remains in the on state whilst a current flows through the first and second transistors.

4. Device according to claim 3, wherein the threshold voltage of the third transistor is chosen in such a way that the third transistor is inhibited when the voltage applied between the input and output terminals is higher than the voltage for damaging the gate of the second transistor.

5. Device according to claim 3, wherein the threshold voltages of the first and second transistors (10, 20) are of opposite signs, substantially equal in absolute value and lower in absolute value than the threshold voltage of the third transistor (30).

6. Device according to claim 1, wherein the first and third transistors are transistors of the "high voltage" type.

7. Device according to claim 1, wherein the first and third transistors are transistors of the IGBT type and the second transistor is of the MOS type.

8. Device according to claim 1, wherein the first, second and third transistors are MOS transistors.

9. Device according to claim 1, wherein the input terminal is a positive terminal, in which the first and third transistors are of the N-type and in which the second transistor is of the P-type.

10. Device according to claim 1, implemented in the form of an integrated circuit.

11. Power supply circuit of an electrical load comprising an electrical load (112) in series with a protection device (100), characterized in that the protection device (100) is in accordance with claim 1.

* * * * *